(12) United States Patent
Diab et al.

(10) Patent No.: US 9,225,496 B2
(45) Date of Patent: Dec. 29, 2015

(54) METHOD AND SYSTEM FOR UTILIZING A RESERVED CHANNEL TO MANAGE ENERGY EFFICIENT NETWORK PROTOCOLS

(71) Applicant: Broadcom Corporation, Irvine, CA (US)

(72) Inventors: Wael William Diab, San Francisco, CA (US); Scott Powell, Alisa Viejo, CA (US)

(73) Assignee: BROADCOM CORPORATION, Irvine, CA (US)

( * ) Notice: Subject to any disclaimer, the term of this patent is extended or adjusted under 35 U.S.C. 154(b) by 61 days.

(21) Appl. No.: 14/102,911

(22) Filed: Dec. 11, 2013

(65) Prior Publication Data
US 2014/0105222 A1    Apr. 17, 2014

Related U.S. Application Data

(63) Continuation of application No. 12/107,467, filed on Apr. 22, 2008, now Pat. No. 8,644,133.

(60) Provisional application No. 60/979,433, filed on Oct. 12, 2007.

(51) Int. Cl.
*H04L 5/00* (2006.01)
*H04L 29/06* (2006.01)
(Continued)

(52) U.S. Cl.
CPC .............. *H04L 5/0091* (2013.01); *H04J 3/16* (2013.01); *H04L 5/0007* (2013.01);
(Continued)

(58) Field of Classification Search
CPC ............... H04J 3/16; H04L 12/40039; H04L 12/40136; H04L 29/06; H04L 43/0876; H04L 49/20; H04L 5/0007; H04L 5/0091; Y02B 60/31; Y02B 60/35; Y02B 60/43; Y02B 60/44; G10H 2240/301; Y10S 370/91
USPC .................. 370/231, 232, 236, 252, 386–389, 370/395.53, 470, 472, 545, 901, 908, 910, 370/912, 220, 431, 46
See application file for complete search history.

(56) References Cited

U.S. PATENT DOCUMENTS 5,381,450 A    1/1995   Lane
5,701,292 A * 12/1997   Chiussi et al. ................ 370/232
(Continued)

FOREIGN PATENT DOCUMENTS

EP     1473870     11/2004
EP     1484876     12/2004
(Continued)

OTHER PUBLICATIONS
Teener, "Audio/Video Bridging for Home Networks," IEEE 802.1AV Bridging Task Group, Jun. 1, 2007.
(Continued)

*Primary Examiner* — Charles C Jiang
*Assistant Examiner* — Mohamed Kamara
(74) *Attorney, Agent, or Firm* — Foley & Lardner LLP; Christopher J. McKenna; Paul M. H. Pua (57) ABSTRACT

Aspects of a method and system for utilization of a reserved and/or out of band channel for managing a data rate of an Ethernet channel are provided. In this regard, a data rate of a network link may be managed via traffic communicated over a reserved and/or out of band channel on said network link. The reserved and/or out of band channel may be an auxiliary channel established in the IEEE 802.3AN standard. Traffic communicated over the reserved and/or out of band channel may enable negotiating a data rate for the link, scheduling a change in the data rate on the link, exchanging link state information, configuring a number of active physical channels on the link, configuring a signal constellation utilized for representing data on said the link, configuring an inter-frame or inter-packet gap, and/or configuring signal levels utilized for signaling on the link.

20 Claims, 6 Drawing Sheets

(51) Int. Cl.
*H04J 3/16* (2006.01)
*H04L 12/26* (2006.01)
*H04L 12/931* (2013.01)
*H04L 12/40* (2006.01)

(52) U.S. Cl.
CPC ......... *H04L 12/40136* (2013.01); *H04L 29/06* (2013.01); *H04L 43/0876* (2013.01); *H04L 49/20* (2013.01); *H04L 12/40039* (2013.01); *Y02B 60/31* (2013.01); *Y02B 60/35* (2013.01); *Y02B 60/43* (2013.01); *Y02B 60/44* (2013.01)

(56) References Cited

U.S. PATENT DOCUMENTS

| | | | |
|---|---|---|---|
| 6,085,248 | A | 7/2000 | Sambamurthy et al. |
| 6,442,174 | B1 | 8/2002 | Lin |
| 6,587,473 | B2 | 7/2003 | Terry et al. |
| 6,731,692 | B1 | 5/2004 | Bhoja |
| 6,795,450 | B1 | 9/2004 | Mills et al. |
| 6,795,451 | B1 * | 9/2004 | Giorgetta et al. ............ 370/510 |
| 6,856,597 | B1 | 2/2005 | Scott |
| 7,050,517 | B1 | 5/2006 | Sallaway et al. |
| 7,308,058 | B2 | 12/2007 | Zerbe et al. |
| 2001/0033611 | A1 | 10/2001 | Grimwood |
| 2002/0136231 | A1 | 9/2002 | Leatherbury |
| 2003/0053493 | A1 | 3/2003 | Mobley |
| 2003/0191854 | A1 | 10/2003 | Hsu |
| 2005/0055456 | A1 * | 3/2005 | Chalupsky et al. ........... 709/233 |
| 2006/0034295 | A1 | 2/2006 | Cherukuri et al. |
| 2006/0140218 | A1 | 6/2006 | Winterton |
| 2006/0221831 | A1 | 10/2006 | Wadekar et al. |
| 2006/0285494 | A1 * | 12/2006 | Li et al. ........................ 370/235 |
| 2007/0073895 | A1 * | 3/2007 | Sebire et al. .................. 709/230 |
| 2007/0081463 | A1 * | 4/2007 | Bohra et al. .................. 370/235 |
| 2007/0127581 | A1 | 6/2007 | Connor |
| 2007/0280239 | A1 | 12/2007 | Lund |
| 2008/0075033 | A1 | 3/2008 | Shattil |
| 2008/0198747 | A1 * | 8/2008 | Young et al. .................. 370/232 |
| 2008/0201626 | A1 | 8/2008 | Sturm |
| 2008/0225841 | A1 | 9/2008 | Conway et al. |
| 2008/0313508 | A1 | 12/2008 | Starr |
| 2009/0031341 | A1 | 1/2009 | Schlack et al. |
| 2009/0097427 | A1 | 4/2009 | Diab |
| 2009/0097442 | A1 | 4/2009 | Diab |
| 2009/0097481 | A1 | 4/2009 | Diab |
| 2009/0097500 | A1 | 4/2009 | Diab |
| 2009/0154355 | A1 | 6/2009 | Diab |
| 2009/0154455 | A1 | 6/2009 | Diab |
| 2009/0154490 | A1 | 6/2009 | Diab |
| 2009/0154492 | A1 * | 6/2009 | Diab et al. .................... 370/465 |
| 2009/0154500 | A1 | 6/2009 | Diab |
| 2009/0154593 | A1 | 6/2009 | Diab |
| 2009/0180529 | A1 | 7/2009 | Agazzi et al. |

FOREIGN PATENT DOCUMENTS

| | | |
|---|---|---|
| EP | 1494407 | 1/2005 |
| GB | 2337672 | 11/1999 |
| WO | WO 00/31923 | 6/2000 |

OTHER PUBLICATIONS

Grow, "802.1 and Energy Efficient Ethernet," pp. 1-6, Sep. 11, 2007.
Bennett et al., "Energy Efficient Ethernet", IEEE 802 Tutorial, Jul. 16, 2007.
Gupta et al., "Dynamic Ethernet Link Shutdown for Energy Conservation on Ethernet Links," IEEE, Jun. 24, 2007.
Wael Diab, "Energy Efficient Ethernet and 802.1," Nov. 2007.
IEEE P802.11 Wireless LANs, Nov. 2005.
Office Action for U.S. Appl. No. 12/107,467 mailed May 11, 2011.
Office Action for U.S. Appl. No. 12/107,467 mailed Oct. 25, 2011.
Notice of Allowance for U.S. Appl. No. 12/107,467 mailed Sep. 19, 2013.

* cited by examiner

▨ Data over aux. channel

METHOD AND SYSTEM FOR UTILIZING A RESERVED CHANNEL TO MANAGE ENERGY EFFICIENT NETWORK PROTOCOLS

CROSS-REFERENCE TO RELATED APPLICATIONS/INCORPORATION BY REFERENCE

This patent application is a continuation of U.S. Non-Provisional patent application Ser. No. 12/107,467, filed Apr. 22, 2008, which makes reference to, claims priority to and claims benefit from U.S. Provisional Patent Application Ser. No. 60/979,433, filed Oct. 12, 2007. Each of the above stated applications is hereby incorporated herein by reference in its entirety.

FIELD OF THE INVENTION

Certain embodiments of the invention relate to a method and system for networking. More specifically, certain embodiments of the invention relate to a method and system for utilizing a reserved channel to manage energy efficient network protocols.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

DETAILED DESCRIPTION OF THE INVENTION

Certain embodiments of the invention may be found in a method and system for utilizing a reserved and/or out of band channel to manage energy efficient network protocols. In this regard, a data rate of a network link may be managed via traffic communicated over a reserved and/or out of band channel on said network link. The reserved and/or out of band channel may be an auxiliary channel established in the IEEE 802.3AN standard. Traffic communicated over said reserved and/or out of band channel may enable negotiating a data rate for the link, scheduling a change in the data rate on the link, exchanging link state information, configuring a number of active physical channels on the link, configuring a signal constellation utilized for representing data on said the link, and/or configuring signal levels utilized for signaling on the link.

Figure 1:
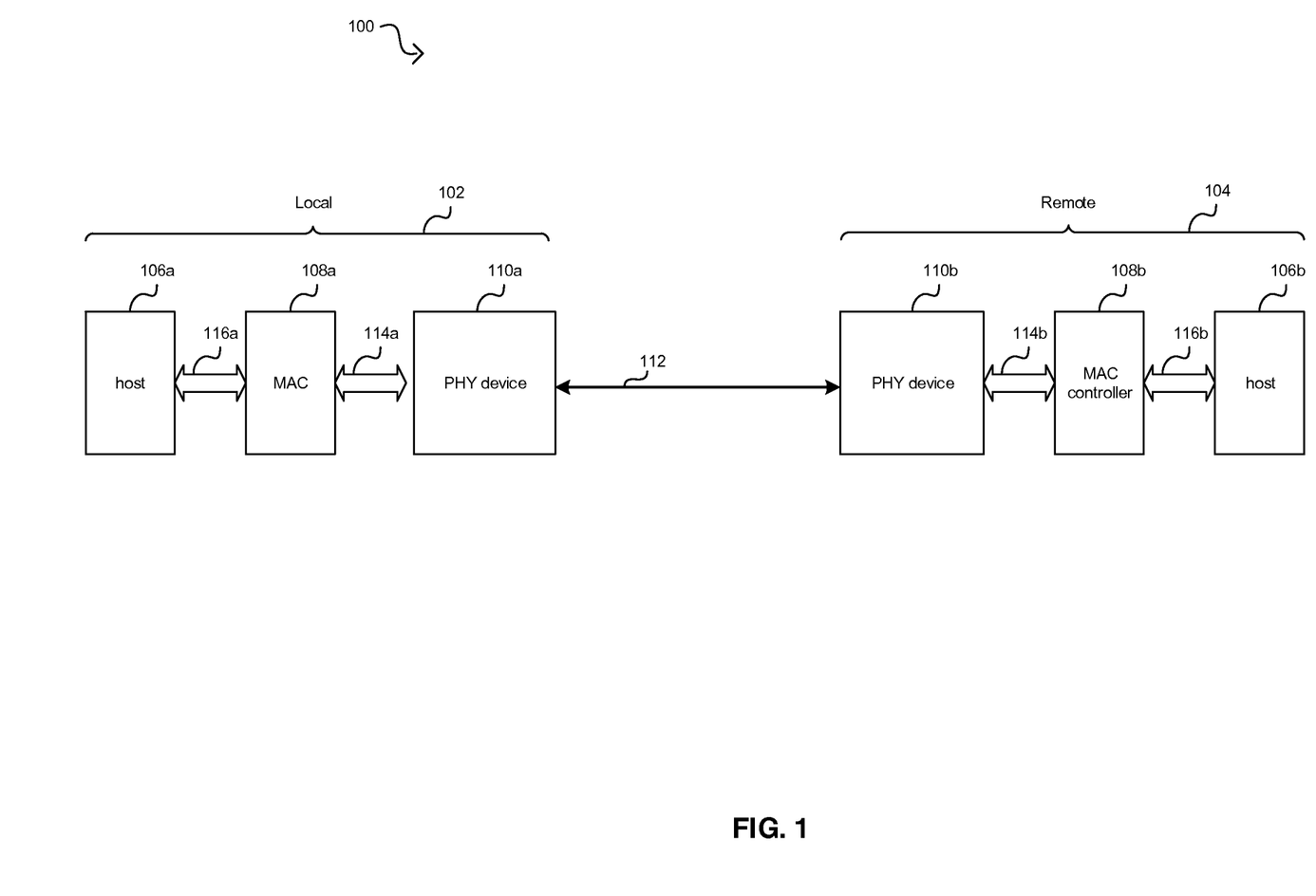
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more physical channels, each of which may, for example, comprise an unshielded twisted pair (UTP). The local link partner 102 and the remote link partner 104 may communicate via two or more physical channels in the cable 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b.

Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet over copper, Ethernet over fiber, and/or backplane Ethernet operations. The PHY device s 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In this regard, the link partners 102 and 104 may control an uplink data rate independent of a downlink data rate and data rate transitions may occur asymmetrically.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary Mils may comprise gigabit MII (GMII), 10 Gigabit MII (XGMII), Serial Gigabit MII (SG-MII), and Reduced Gigabit MII (RGMII).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels at a fixed data rate which may result in network links being underutilized and transmitting IDLE symbols for significant portions of time. In this regard, when the link partners 202 and 204 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters, and/or circuitry to account for variables such as the type of cabling over which data is being communicated and the environmental conditions (e.g. temperature) surrounding the cabling. Once the link partners are "trained", they may initially transmit data at 10 Gbps, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 10 Gbps may be higher than necessary or desired. Accordingly, controlling the data rate of the connection between the link partners 102 and 104 may enable the link partners 102 and 104 to communicate in a more energy efficient manner. In this regard, a low(er) data rate on the link 112 may reduce power consumed on the link 112 and in the link partners 102 and 104. The data rate may be controlled by, for example, controlling a number of physical channels utilized to communicate data, controlling the pulse amplitude modulation (PAM) levels used for signaling, controlling the signal constellation utilized for representing data on the link, and controlling the length of tie between frames (the inter-frame gap).

In this manner, one or more policies and/or protocols may be implemented by the link partners 102 and 104 in order to improve energy efficiency. Accordingly, the link partners 102 and 104 may each comprise an energy efficient network (EEN) control entity which may comprise suitable logic, circuitry, and/or code for implementing the energy efficient networking policies and/or protocols. In order to implement these EEN protocols and/or policies, the link partners 102 and 104 may need to exchange control and/or management traffic. For example, control and/or management traffic may be utilized to communicate link state information, negotiate data rates on the link 112, indicate that a data rate change may be desired or necessary, and/or schedule a data rate transition. Accordingly, aspects of the invention may enable utilizing a reserved and/or out-of-band channel for exchanging these control and/or management messages.

Figure 2:
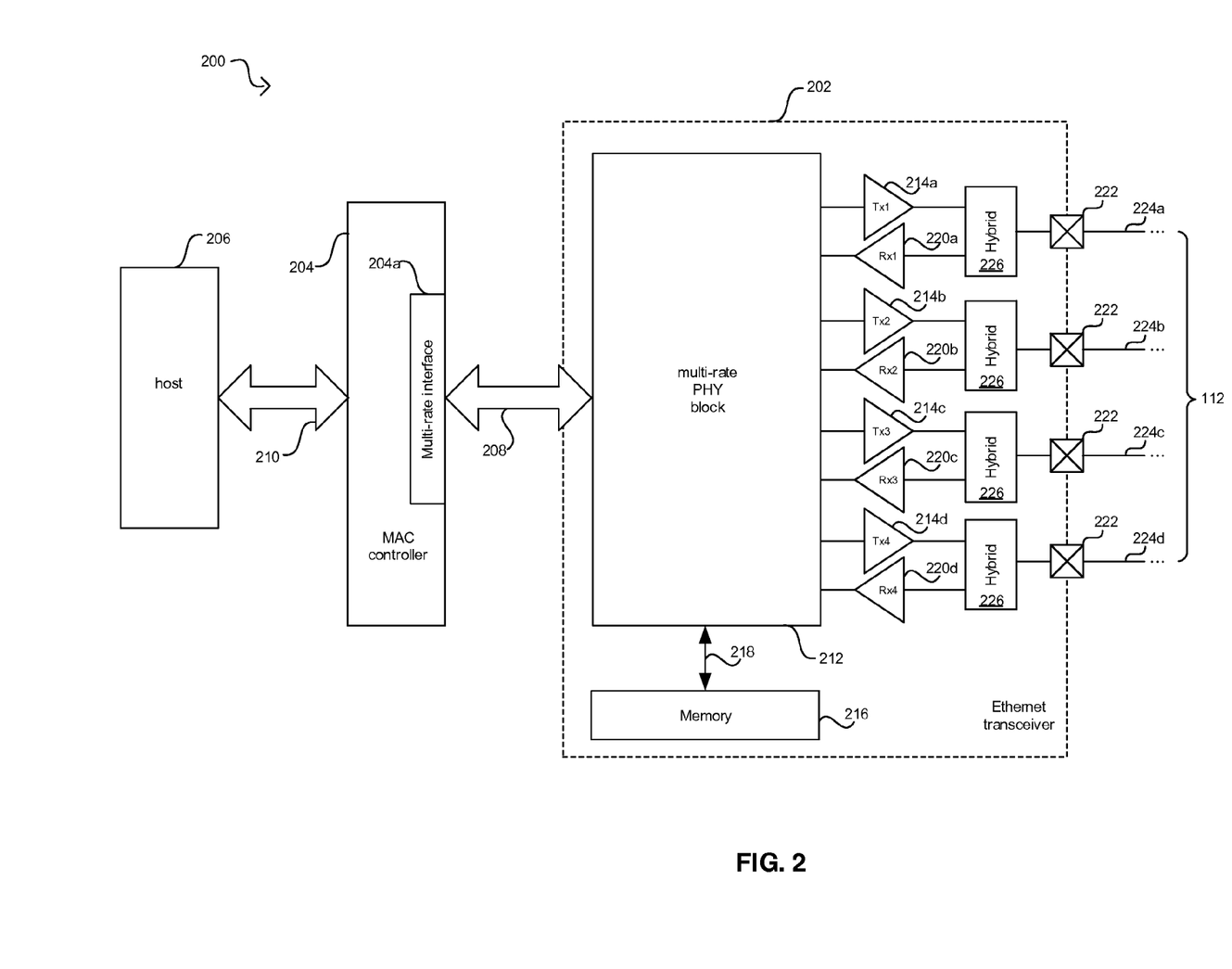
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote link partner. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between link partners. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a physical channel of the cable 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end cross (NEXT) cancellers. Each hybrid 226 in the local link partner 300 may be communicatively coupled to an input/output interface 222.

In operation, the link partner 200 may communicate with a remote partner via the cable 112. For example, for 10 Gbps Ethernet, the link partner 200 may transmit data to and receive data from a remote partner via the physical channels 224a, 224b, 224c, and 224d. In this regard, when there is no data for the link partner 200 to transmit, then it may transmit IDLE symbols to keep itself and/or the remote partner "trained". In this manner, power consumption of a network may be largely independent of the amount of actual data being transmitted over the network. Accordingly, controlling the data rate over the cable 112 may enable the link partners 200 to communicate in a more energy efficient manner.

In various embodiments of the invention, the link partner 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable physical layer block 212 associated with the unused physical channels may be powered down. A physical channel not utilized to convey information and/or in a low(er) power state may be referred to as inactive, while a physical channel utilized to convey information and/or not in a low(er) power state may be referred to as active. In various embodiments of the invention, a channel in a low(er) power state a may convey little or no data and may be silent, convey IDLE symbols, and/or convey other energy. In some instances, aspects of the invention may enable placing all channels of a link into a low(er) power state. In some instances, aspects of the invention may enable placing all channels of a link into a low(er) power state while still maintaining a reserved and/or out of band channel. To coordinate data rate transitions on one or more physical channels of the link 112, the link partner 200 may exchange control and/or management messages with a remote link partner via a reserved and/or out-of-band channel. In an exemplary embodiment of the invention, the link partner 200 may utilize the auxiliary channel defined in the 10GBASE-T standard, as described in FIG. 5. In other various embodiments of the invention, a reserved and/or out of band channel may be established during data rate transitions on a link. For example, when transitioning to a new data rate, the new data rate may be higher than a necessary data rate by an amount equal to (or slightly greater to provide some headroom) the reserved and/or out of band channel.

In various embodiments of the invention, a data rate of a communication link may be controlled by adjusting the size of a signal constellation. In this regard, a signal constellation utilized to transmit signals may be reduced to provide lower data rates. For example, a subset of a larger signal constellation may be chosen such that encoding and decoding signals may be less hardware and/or processor intensive. In this manner, portions of the multi-rate capable physical layer block 212 may consume less energy when encoding data utilizing a smaller or different signal constellation. To coordinate changing of the signal constellation, the link partner 200 may exchange control and/or management messages with a remote link partner via a reserved and/or out-of-band channel. In an exemplary embodiment of the invention, the link partner 200 may utilize the auxiliary channel defined in the 10GBASE-T standard, as described in FIG. 5. In other various embodiments of the invention, a reserved and/or out of band channel may be established during data rate transitions on a link. For example, when transitioning to a new data rate, the new data rate may be higher than a necessary data rate by an amount equal to (or slightly greater to provide some headroom) the reserved and/or out of band channel. Accordingly, a reserved and/or out of band channel established upon a transitioning to a first data rate may be utilized for coordinating a subsequent transition to a second data rate. In an exemplary embodiment of the invention, a reserved and/or out of band channel may be utilized to coordinate a portion of data rate transitions and another method may be utilized to coordinate a portion of data rate transitions.

In various embodiments of the invention, a data rate of a communication link may be controlled by adjusting the PAM levels utilized for signaling. For example, in instances such as 10 Gbps Ethernet, where data it typically encoded utilizing a PAM-16 scheme, aspects of the invention may enable switching to PAM-8 or PAM-4 for lower data rates. In this regard, utilizing fewer PAM levels, and thus smaller voltages, may reduce power consumption in the system 200 as well as energy consumed on the link 212. To coordinate changing of the PAM levels, the link partner 200 may exchange control and/or management messages with a remote link partner via a reserved and/or out-of-band channel. In an exemplary embodiment of the invention, the link partner 200 may utilize the auxiliary channel defined in the 10GBASE-T standard, as described in FIG. 5. In other various embodiments of the invention, a reserved and/or out of band channel may be established during data rate transitions on a link. For example, when transitioning to a new data rate, the new data rate may be higher than a necessary data rate by an amount equal to (or slightly greater to provide some headroom) the reserved and/or out of band channel.

In various embodiments of the invention, a data rate of a communication link may be controlled by controlling the inter-frame gap time or inter-packet gap (IPG) time. In this regard, increasing the IFG may reduce the data rate while decreasing the IFG may increase the data rate. To coordinate changing of the IFG, the link partner 200 may exchange control and/or management messages with a remote link partner via a reserved and/or out-of-band channel. In an exemplary embodiment of the invention, the link partner 200 may utilize the auxiliary channel defined in the 10GBASE-T standard, as described in FIG. 5. In other various embodiments of the invention, a reserved and/or out of band channel may be established during data rate transitions on a link. For example, when transitioning to a new data rate, the new data rate may be higher than a necessary data rate by an amount equal to (or slightly greater to provide some headroom) the reserved and/or out of band channel.

Figure 3:
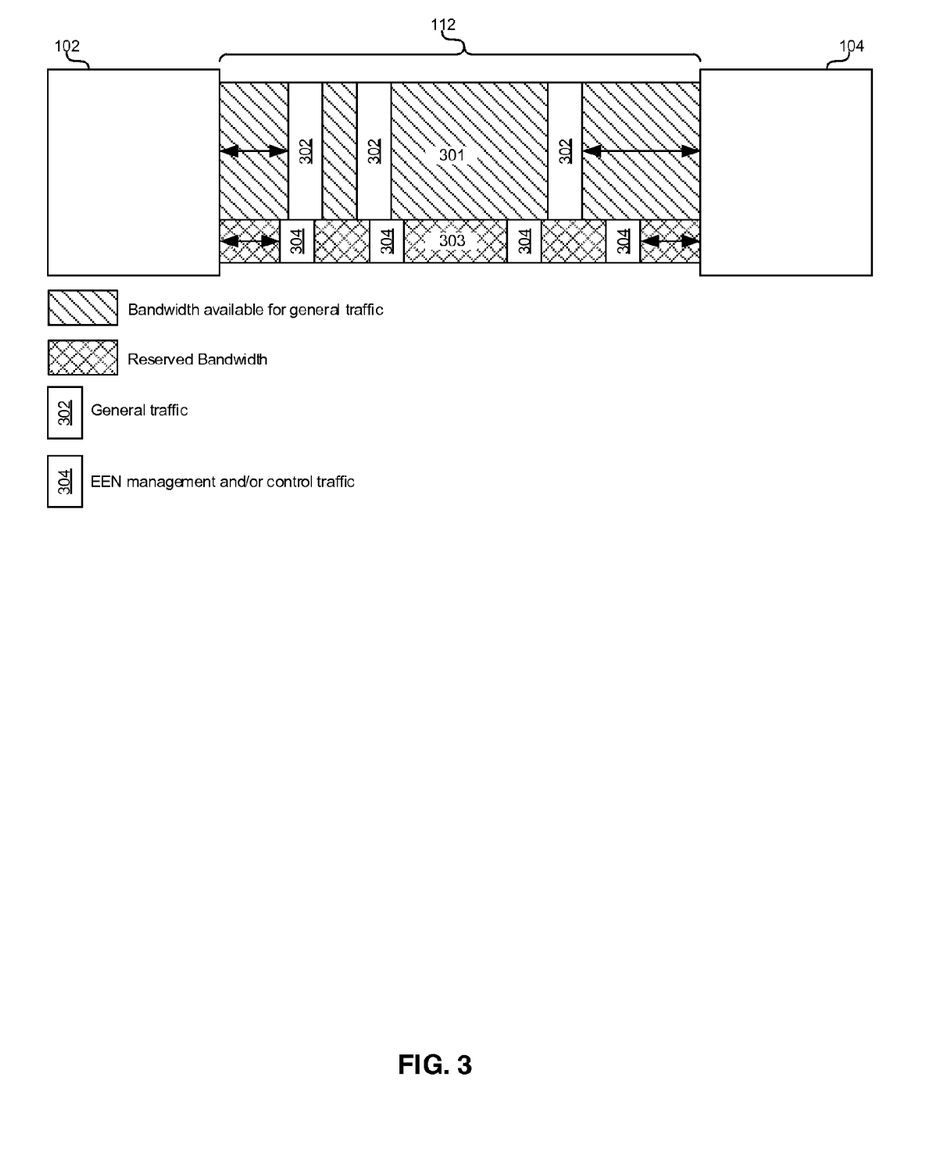
FIG. 3 is a is a diagram illustrating the utilization of a reserved and/or out of band channel for managing a data rate of an Ethernet physical channel, in accordance with an embodiment of the invention.

FIG. 3 is a diagram illustrating the utilization of a reserved and/or out of band channel for managing a data rate of an Ethernet physical channel, in accordance with an embodiment of the invention. Referring to FIG. 3, there is shown link partners 102 and 104 which may communicate via the cable 112. The cable 112 may, for example, comprise one or more twisted pairs as described in FIG. 1.

The link 112 may support a total bandwidth comprised of the portions 301 and 303. In this regard, the portion 301 may be utilized for communicating Ethernet frames carrying general Ethernet traffic. The portion 303 may comprise a reserved and/or out-of-band channel. In an exemplary embodiment of the invention, the reserved and/or out of band channel 303 may be as allocated in the IEEE 802.3AN standard, as described below in FIG. 5. In various other embodiments of the invention, the reserved and/or out of band channel 303 may comprise bandwidth allocated during a data rate transition. For example, the reserved and/or out of band channel 303 may be a fixed amount of bandwidth in addition to the bandwidth 301 established for conveying general Ethernet traffic. For another example, the reserved and/or out of band channel 303 may be a fixed percentage of the bandwidth 301 established for conveying general Ethernet traffic.

Aspects of the invention may enable utilizing the 303 portion of the bandwidth for managing the portion 301 of the bandwidth. In this regard, the link partners 102 and 104 may be enabled, for example, to control a number of physical channels utilized for communicating data (e.g. general Ethernet traffic 302) between the link partners 102 and 104. Additionally, a number of PAM levels utilized for signaling on the link 112, a size of a signal constellation used to represent data on the link 112, and/or inter-frame gap may be adjusted to control data rates on the link 112. In this manner, possible data rates communicated over the 301 portion of the bandwidth may be dynamically controlled. However, the link partners 102 and 104 may need a way to coordinate changes in the data rate of the 301 portion of the bandwidth. In this regard, energy efficient network (EEN) management and/or control traffic 304 may be exchanged between the link partners 102 and 104 to manage the 301 portion of the link 112. Exemplary information exchanged may comprise requests to change data rate, suggestions for a new data rate, suggestions on how to change data rate, suggestions on when to change data rate, acknowledgment of EEN requests and/or suggestions, denial of EEN requests and/or suggestions, and general information relating to EEN policies and/or protocols.

Figure 4A:
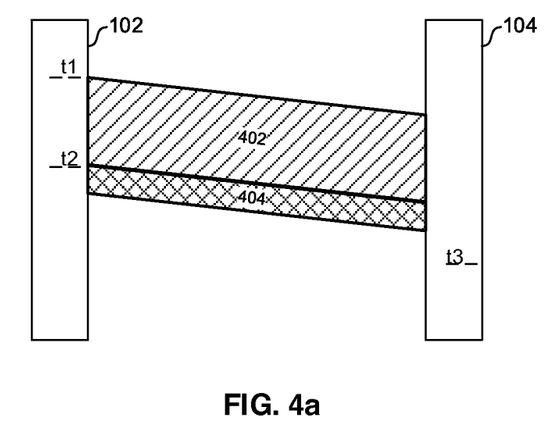
FIGS. 4A and 4B illustrate some advantages of the coordination of energy efficient network protocols utilizing a reserved and/or out of band channel, in accordance with an embodiment of the invention.
Figure 4B:
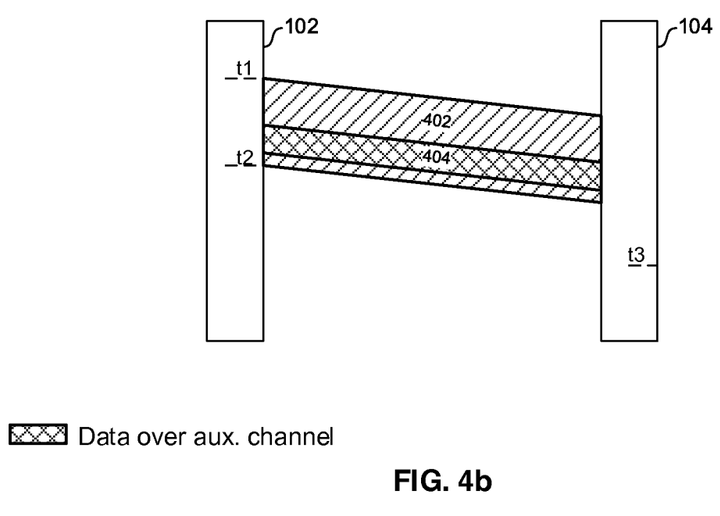

FIGS. 4A and 4B illustrate some advantages of the coordination of energy efficient network protocols utilizing a reserved and/or out of band channel, in accordance with an embodiment of the invention. Referring to FIGS. 4A and 4B, there is shown an exemplary communication between link partners 102 and 104.

At time instant t1, link partner 102 may begin transmission of block of general Ethernet data 402. For example, the block 402 may comprise a frame received by a physical layer device from a MAC controller just prior to time instant t1. Shortly after time instant t1, link partner 102 may wish to communicate some energy efficient network (EEN) management and/or control information to the link partner 104. However, as depicted in FIG. 4A, without a reserved and/or out of band channel for communicating EEN control and/or management traffic, the link partner may have to wait until transmission of block 402 completes at time instant t2 before EEN management and/or control block 404 may be transmitted. This delay in communicating EEN management and/or control information may increase the complexity of implementing EEN policies and/or protocols on the link 112.

Without a reserved and/or out of band channel for managing and/or controlling EEN policies, the only alternatively may be for the link partner 102 to interrupt transmission of 402 to send 404. However, interrupting data on the link to convey EEN management and/or control traffic may be less than ideal as it may negatively impact the data 402 and/or a user's experience with the data 402. Moreover, interrupting transmission of 402 may require physical layer buffering which may significantly increase cost and/or complexity of a physical layer device.

Conversely, as depicted in FIG. 4B, if a reserved and/or out of band channel is utilized for EEN policy management and/or control, then the block 404 may be transmitted in parallel with the block 402. In this manner, the general Ethernet traffic may be unaffected by EEN management and/or control traffic. Utilization of a reserved and/or out of band channel for data rate management and/or control may speed up data rate transitions and may thus require less buffering when transitioning to a high(er) data rate. Additionally, there may be processing time associated with implementing EEN policies and/or protocols and aspects of the invention may reduce and/or hide latencies and/or processing time required for performing EEN events such as data rate transitions.

In various embodiments of the invention, EEN management and/or control traffic in the block 404 may coordinate a data rate transition on a link between the link partners 102 and 104. In this regard, aspects of the invention may enable designating a byte of an Ethernet frame in the block 402 on which to transition. In this regard, the link partner 102 may transition just after transmitting the designated byte and the link partner may transition just after receiving the byte. In this manner, data rate transitions on a link may occur mid-frame.

Figure 5:
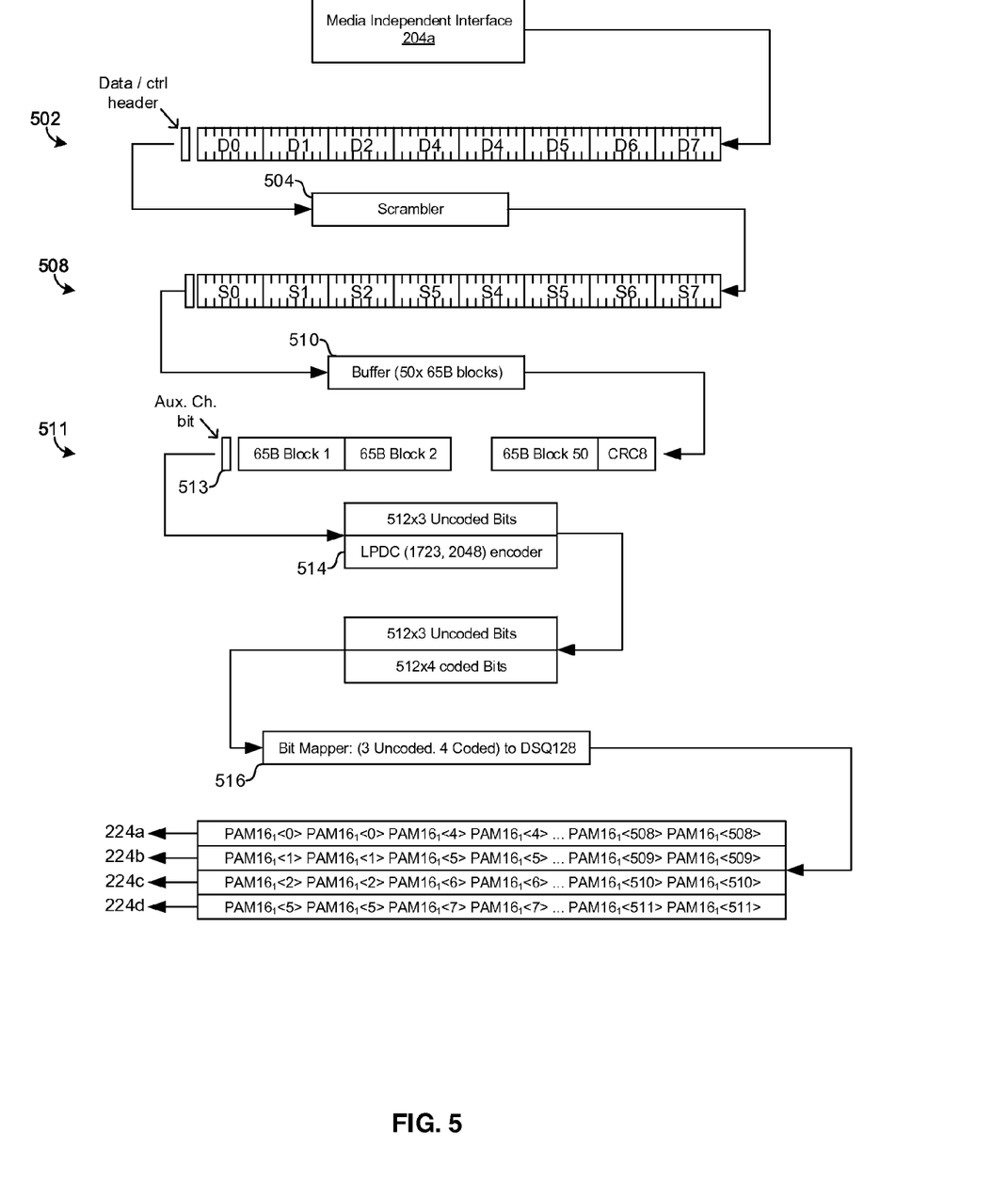
FIG. 5 is a diagram illustrating an exemplary reserved and/or out of band channel in 10GBASE-T Ethernet, in accordance with an embodiment of the invention.

FIG. 5 is a diagram illustrating an exemplary reserved and/or out of band channel in 10GBASE-T Ethernet, in accordance with an embodiment of the invention. Referring to FIG. 5, 10GBASE-T Ethernet communications may begin when 64 bits of data are transferred via the media independent interface 204a to the Ethernet transceiver 202. Next, a 1-bit data/control header may be prepended to the 64 bit block to generate a 65 bit block 502. The 65-bit block 502 may be passed through a scrambler 504 resulting in the scrambled 65 bit block 508. A buffer 510 may be enabled to aggregate 50 of the scrambled 65-bit blocks 508. An 8-bit cyclic redundancy check (CRC8) may be appended to the 50 65-bit blocks and 1-bit of auxiliary data 513 may be prepended to the 50 65-but blocks, resulting in a 3259-bit frame 511. The frame 511 may pass through a low density parity check (LDPC) encoder 514 resulting in 512 7-bit labels where each of the 512 labels comprises 3 uncoded bits and 4 coded bits. The 7-bit labels may then pass through a bit mapper 516 which maps the labels into 512 2D symbols selected from a DSQ128 constellation. The 512 DSQ128 symbols are then transmitted over the 4 physical channels 224a-224d (FIG. 2) in the form of 256 constituent PAM16 symbols per physical channel. Additional details regarding data transmission in a 10GBASE-T system may be found in the applicable standards documents.

Aspects of the invention may enable the auxiliary bit 513 to be utilized for managing, controlling, and/or implementing energy efficient network (EEN) policies in the 10GBASE-T network. In this regard, a conventional 10GBASE-T network may transmit 800Msymbols per second on each physical channel. Accordingly, a data rate of the auxiliary channel may be calculated as shown in the following EQ. 1.

$$\frac{1 \text{ auxiliary bit}}{256 \text{ symbols}} \cdot \frac{800M \text{ symbols}}{\text{sec}} = \frac{3.125M \text{ aux bits}}{\text{sec}} \qquad \text{EQ. 1}$$

Thus, the 10GBASE-T standard reserves an auxiliary channel of 3.125 Mbps. Accordingly, this auxiliary channel may be utilized for communicating EEN management and/or control traffic.

Figure 6:
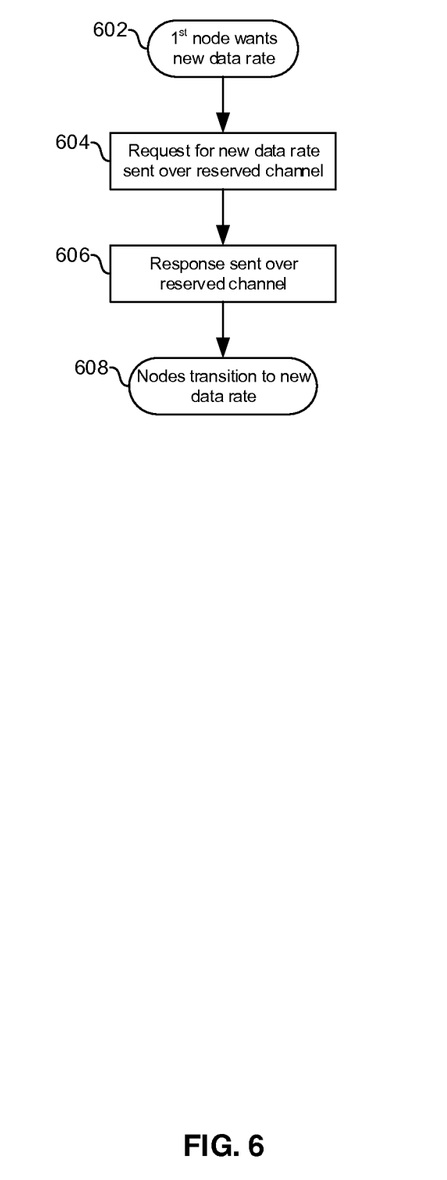
FIG. 6 is a flowchart illustrating exemplary communication over a reserved and/or out of band channel, in accordance with an embodiment of the invention.

FIG. 6 is a flowchart illustrating exemplary communication over a reserved and/or out of band channel, in accordance with an embodiment of the invention. The exemplary steps may begin with step 602 in which a first link partner may make a decision to transition to a different data rate for a network link communicatively coupling it to a second link partner. Subsequent to step 602, the exemplary steps may advance to step 604. In 604 the first link partner may transmit a request for a data change rate on the link. In this regard, the request may comprise one or more permissible rates which the first link partner may want to transition to, one or methods by which the data rate may be changed, and a time at which the first link partner wants to change the data rate. Subsequent to step 604, the exemplary steps may advance to step 606. In 606 the second link partner may respond to the request. In this regard, the response may comprise an agreement to change the data rate, a selection of how to change the data rate, and/or an agreement of when to change the data rate. Subsequent to step 606, the exemplary steps may advance to step 610. In step 610, the link partners may transition to the selected data rate via the selected method at the determined time.

Aspects of a method and system for utilization a reserved and/or out of band channel for managing a data rate of an Ethernet channel are provided. In this regard, a data rate of a network link, such as the link 112 of FIG. 1, may be managed via traffic communicated over a reserved and/or out of band channel, such as the channel 303 of FIG. 3, on the network link. The reserved and/or out of band channel may be an auxiliary channel established in the IEEE 802.3AN standard, as described with respect to FIG. 5. Traffic communicated over said reserved and/or out of band channel may enable negotiating a data rate for the link, scheduling a change in the data rate on the link, exchanging link state information, configuring a number of active physical channels on the link, configuring a signal constellation utilized for representing data on said the link, configuring inter-frame or inter-packet gaps, and/or configuring signal levels utilized for signaling on the link.

Another embodiment of the invention may provide a machine-readable storage, having stored thereon, a computer program having at least one code section executable by a machine, thereby causing the machine to perform the steps as described herein for utilizing a reserved and/or out of band channel to manage energy efficient network protocols.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a first link partner device that is configured for communication with a second link partner device via an Ethernet link:
determining to initiate a data rate change in the first link partner device;
establishing, responsive to the determination to initiate the data rate change, a reserved channel in the Ethernet link between the first link partner device and the second link partner device to transmit a control message, the reserved channel comprising a portion of bandwidth of the Ethernet link for carrying traffic that excludes data traffic; and
transmitting the control message via the established reserved channel, the control message including control information that facilitates a change by the first link partner device from a first data rate to a second data rate.

2. The method according to claim 1, wherein the portion of bandwidth is an auxiliary channel established in the IEEE 802.3AN standard.

3. The method according to claim 1, wherein establishing the reserved channel comprises establishing the reserved channel to transmit the control message using bandwidth of the Ethernet link other than that allocated to carrying data traffic.

4. The method according to claim 1, wherein the portion of bandwidth is allocated as a fixed percentage of bandwidth established for data traffic.

5. The method according to claim 1, comprising establishing the reserved channel and transmitting the control message without interrupting an existing data block transmission from the first link partner device or having to wait until the existing data block transmission completes.

6. The method according to claim 1, wherein the control message includes a request to change from the first data rate to the second data rate, or an acknowledgement to a request to change from the first data rate to the second data rate.

7. The method according to claim 1, wherein the control message includes a proposal for the second data rate.

8. The method according to claim 1, wherein the control message includes a proposed configuration for the second data rate.

9. The method according to claim 1, wherein the control message includes information regarding when to switch from the first data rate to the second data rate.

10. The method according to claim 9, wherein the control message includes information regarding a byte of an Ethernet frame on which to switch from the first data rate to the second data rate.

11. The method according to claim 1, wherein the control message includes information relating to an energy efficiency control policy or protocol.

12. The method according to claim 1, wherein the control message includes link state information.

13. A system, comprising:
one or more circuits for use in a first link partner device that is configured for communication with a second link partner device via an Ethernet link, the one or more circuits being configured to:
determine to initiate a data rate change in the first link partner device;
establish, responsive to the determination to initiate the data rate change, a reserved channel in the Ethernet link between the first link partner device and the second link partner device to transmit a control message, the reserved channel comprising a portion of bandwidth of the Ethernet link for carrying traffic that excludes data traffic; and
transmits the control message via the established reserved channel, the control message including control information that facilitates a change by the first link partner device from a first data rate to a second data rate.

14. The system according to claim 13, wherein the reserved channel to transmit the control message is established using bandwidth of the Ethernet link other than that allocated to carrying data traffic.

15. The system according to claim 14, wherein the portion of bandwidth is allocated as a fixed percentage of bandwidth established for data traffic.

16. The system according to claim 13, wherein the control message includes one of a request to change from the first data rate to the second data rate, an acknowledgement, a proposal for the second data rate, a proposed configuration for the second data rate, or information regarding when to switch from the first data rate to the second data rate.

17. The system according to claim 13, wherein the control message includes information relating to an energy efficiency control policy or protocol.

18. The system according to claim 13, wherein the control message includes link state information.

19. A computer program product, embodied on a non-transitory computer-readable medium, comprising:
computer code configured for determining to initiate a data rate change in a first link partner device, the first link partner device is configured for communication with a second link partner device via an Ethernet link;
computer code configured for establishing, by the first link partner device responsive to the determination to initiate the data rate change, a reserved channel in the Ethernet link between the first link partner device and the second link partner device to transmit a control message, the reserved channel comprising a portion of bandwidth of the Ethernet link for carrying traffic that excludes data traffic; and
computer code configured for transmitting the control message via the established reserved channel, the control message including control information that facilitates a change by the first link partner device from a first data rate to a second data rate.

20. The computer program product of claim 19, wherein the computer code configured for establishing the reserved channel and the computer code configured for transmitting the control message are further configured to establish the reserved channel and transmit the control message without interrupting an existing data block transmission from the first link partner device or having to wait until the existing data block transmission completes.

* * * * *